United States Patent [19]

Adkinson et al.

[11] Patent Number: 5,167,363
[45] Date of Patent: Dec. 1, 1992

[54] COLLAPSIBLE STORAGE PEN

[76] Inventors: Steven S. Adkinson, 1041 17th St., Santa Monica, Calif. 90403; Avi Fattal, 13818 Weddington, Van Nuys, Calif. 91401; Mark Weinberg, 1720 Speyer La., Redondo, Calif. 90298

[21] Appl. No.: 834,140

[22] Filed: Feb. 10, 1992

[51] Int. Cl.⁵ .............................................. B65D 25/04
[52] U.S. Cl. ............................ 229/120.31; 229/117.05; 229/120.29
[58] Field of Search ...................... 229/117.05, 117.06, 229/120.29, 120.31, 120.36, 120.06; 224/42.42; 217/22, 30, 31, 32, 33; 296/37.5

[56] References Cited

U.S. PATENT DOCUMENTS

| | | | |
|---|---|---|---|
| 901,858 | 10/1908 | Williams | 229/117.06 |
| 2,344,567 | 3/1944 | Sidebotham | 229/117.05 |
| 2,485,028 | 10/1949 | Bauernfreund et al. | 229/117.05 |
| 2,705,588 | 4/1955 | Huckstep | 229/120.36 |
| 2,765,971 | 10/1956 | Golob | 229/120.36 |
| 3,003,680 | 10/1961 | Wilcox, Jr. | 229/117.06 |
| 3,039,667 | 6/1962 | Kozlik | 229/120.36 |
| 3,372,512 | 2/1968 | Wolfe . | |
| 3,640,445 | 2/1972 | Durham | 229/120.29 |
| 3,843,039 | 10/1974 | Brown et al. | 229/120.31 |
| 3,871,569 | 3/1975 | Wharton, Jr. . | |
| 3,880,343 | 4/1975 | Rockefeller . | |
| 3,986,656 | 10/1976 | November . | |
| 3,997,102 | 12/1976 | Jones . | |
| 4,124,158 | 11/1978 | Beck . | |
| 4,226,348 | 10/1980 | Dottor et al. . | |
| 4,280,650 | 7/1981 | Gardner et al. . | |
| 4,534,504 | 8/1985 | Locke | 229/120.29 |
| 4,540,213 | 9/1985 | Herlitz et al. . | |
| 4,718,584 | 1/1988 | Schoeny . | |
| 4,951,867 | 8/1990 | McManus . | |
| 5,004,146 | 4/1991 | Thominet et al. | 229/120.31 |
| 5,052,580 | 10/1991 | Khoury | 224/42.42 |
| 5,054,668 | 10/1991 | Ricchiuti | 224/42.42 |

Primary Examiner—Allan N. Shoap
Assistant Examiner—Christopher McDonald
Attorney, Agent, or Firm—Cumpston & Shaw

[57] ABSTRACT

A collapsible bottomless storage pen having a continuous articulated peripheral wall including parallel sidewalls and interconnecting end walls. Each end wall includes a bend line. Interior connecting flaps are hingedly attached to the end walls and cooperatively engage each other to retain the pen in an operative position. The end walls and connecting flaps are sized to permit folding of the pen to the length of the sidewalls, such that the connecting flaps and end walls are parallel to and between the parallel collapsed sidewalls.

10 Claims, 4 Drawing Sheets

COLLAPSIBLE STORAGE PEN

The present invention relates to storage pens more particularly, to a collapsible bottomless storage pen having permanently affixed interior walls.

BACKGROUND OF THE INVENTION

Economic and ecological forces have promoted the use of flexible grocery bags, often formed of paper or plastic. While the flexible grocery bags provide a variety of benefits, the flexible bags are subject to substantial disadvantages when transported in a motor vehicle. Specifically, during transport of the bags in the trunk or the back of a car, the contents often sufficiently deform the bags to permit the contents to escape from the bag.

The prior art includes numerous devices for securing and retaining loaded flexible bags during transport. U.S. Pat. No. 3,986,656 discloses a collapsible package holding structure for placement in the back of a station wagon to be used to hold bags of groceries during transit of the vehicle.

U.S. Pat. No. 4,718,584 discloses an accessory for hatchback automobiles which forms an open top enclosure for retaining small articles in restricted position during movement of the automobile.

U.S. Pat. Nos. 4,226,348; 4,540,213 and 4,372,512 disclose cargo organizers for retaining flexible bags in automobiles.

U.S. Pat. No. 4,951,867 discloses a folding separator for use in the trunk of a motor vehicle.

SUMMARY OF THE INVENTION

The present invention provides a collapsible storage pen movable between an open operative position and collapsed position wherein the pen folds into a flat structure. The pen is conveniently used to retain items within flexible bags such that the items remain within the bags during transit.

The present invention includes a collapsible bottomless storage pen having a operative position for forming an interior storage area and a collapsed position. The pen includes a peripheral wall formed of articulated wall segments and an interior divider wall having one end hingedly attached to the peripheral wall intermediate adjacent segments and the other end adapted to engage the peripheral wall in the operative position, the point of attachment length of the divider and lengths of the articulated wall segments being selected so that the patent can be collapsed to a length no longer than the longest articulated wall segment.

DETAILED DESCRIPTION OF THE PREFERRED EMBODIMENTS

Figure 1:
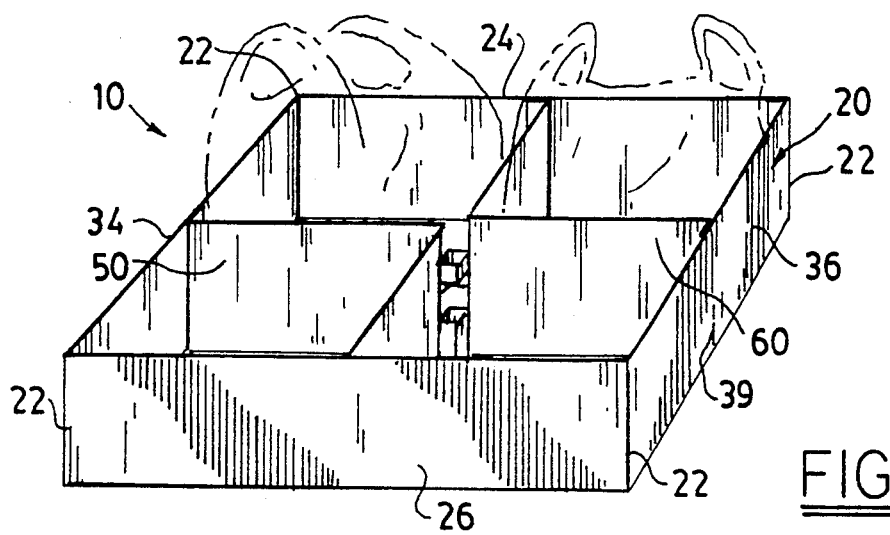
FIG. 1 is a perspective view of a first preferred embodiment of the present invention.
Figure 7:
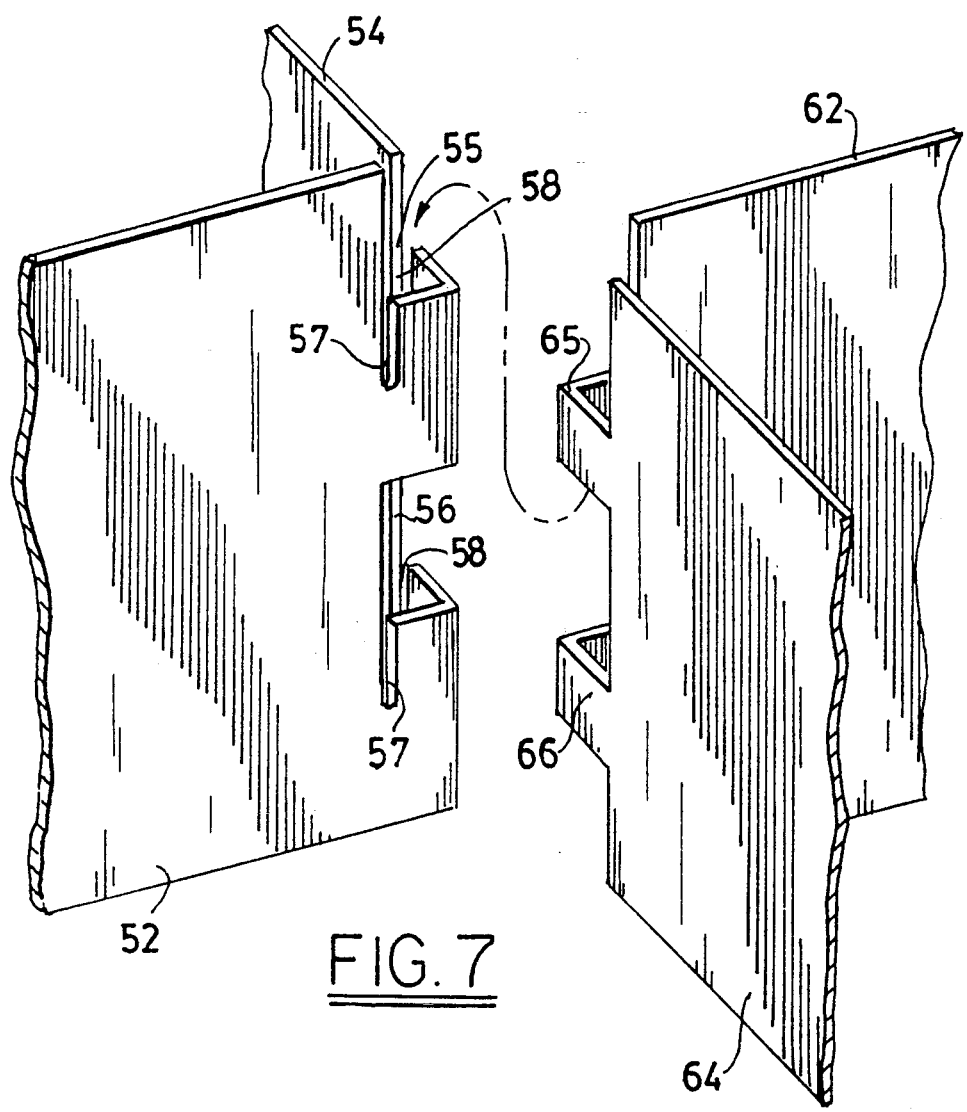
FIG. 7 is a partial perspective view showing the interconnection of a portion of the storage pen.
Figure 6:
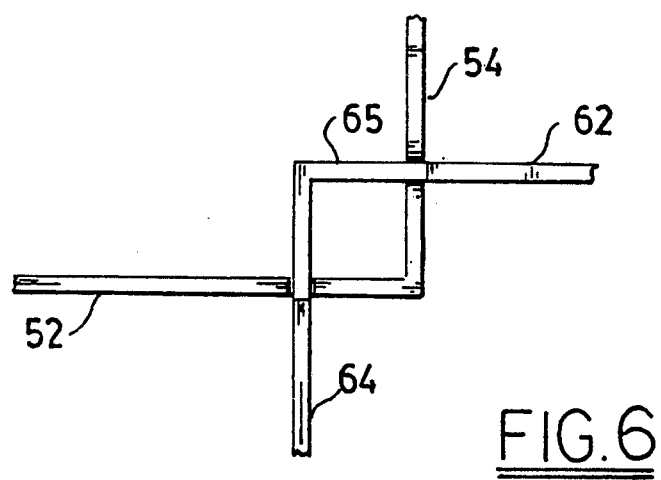
FIG. 6 is an enlarged top plan view taking along lines 6—6 of FIG. 2.
Figure 8:
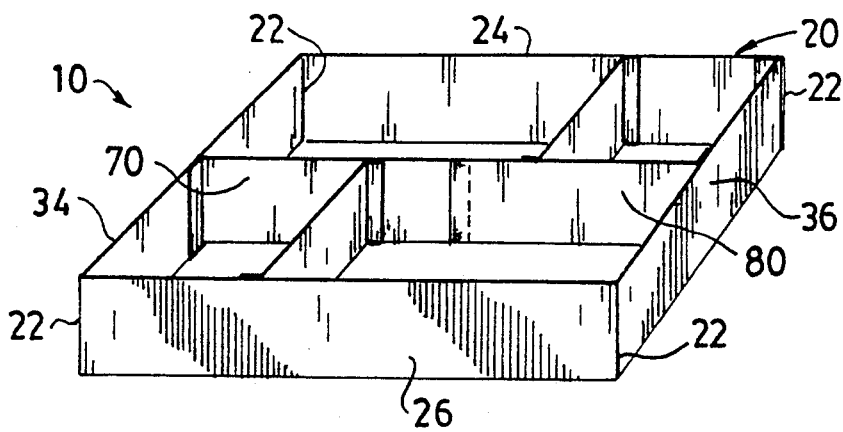
FIG. 8 is a perspective view of a second preferred embodiment of the invention.

Referring to FIGS. 1 and 8, the present invention includes a collapsible bottomless storage pen 10. The storage pen 10 includes a first embodiment shown in FIGS. 1–7, and a second embodiment shown in FIGS. 8–14.

In each embodiment, the storage pen 10 includes a peripheral wall 20. The peripheral is formed of a plurality of articulated wall segments, each segment hingedly attached to the adjacent sections. Preferably, the wall segments are integrally joined to form a continuous loop. The segment joints are corner bend lines 22. The corners 22 allow adjacent segment joints to be hingedly connected such that the adjacent segments may assume a parallel or perpendicular orientation.

The wall segments include a pair of sidewalls 24,26 and a pair of end walls 34,36. The end walls 34,36 are hingedly attached to the sidewalls 24,26. The sidewalls 24,26 are of equal fixed length, in that the sidewalls do not include bend lines. The end walls 34,36 are of an equal length to each other, wherein the length of the end walls is less than the sidewalls 34,26.

In each embodiment, each end wall 34,36 includes a bend line 39 oriented transverse to the length of the end wall. Each bend line 39 is intermediate of the corners 22, and defines a folding length from the sidewall 24,26 to the bend line 39. Preferably, the bend line 39 bisects the length of the end wall 34,36.

Referring to FIGS. 1–5 and 13, in the first embodiment, the storage pen 10 includes interior first and second connecting flaps 50,60. The connecting flaps 50,60 form interior divider walls which subdivide the area enclosed by the continuous peripheral wall. The first connecting flap 50 has one end hingedly affixed to one end 34 wall at a first attachment point. The second connecting flap 60 is hingedly affixed to the other end wall 36 at a second attachment point. As shown in FIGS. 1–5, the first and second attachment points in the first embodiment are substantially coincident with the bend lines 39 of the respective end wall 34,36. However, the pen 10 may be formed such that the bend lines 39 and the attachment points are offset.

Figure 2:
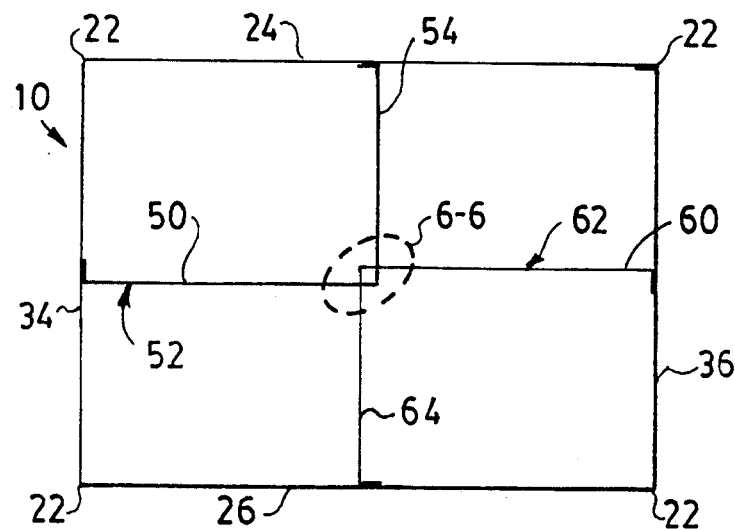
FIG. 2 is a top plan view of the first embodiment in an operative position.
Figure 3:
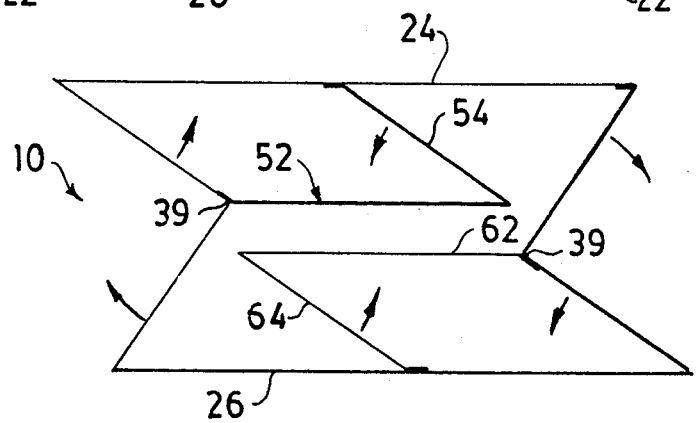
FIG. 3 is a top plan view of the first embodiment showing motion of the wall segments during transition of the storage pen from the operative to the collapsed position.
Figure 4:
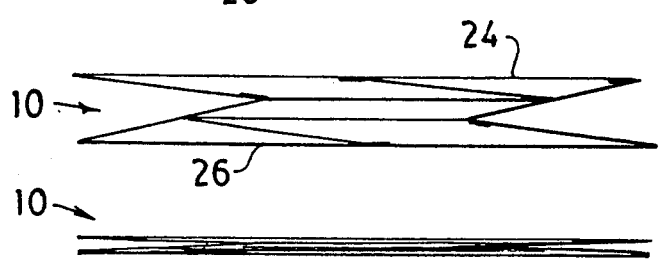
FIG. 4 is a top plan view further showing motion of the segments toward the collapsed position.
Figure 5:
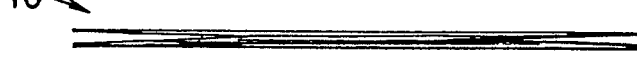
FIG. 5 is a top plan view showing the present invention in the collapsed position.
Figure 13:
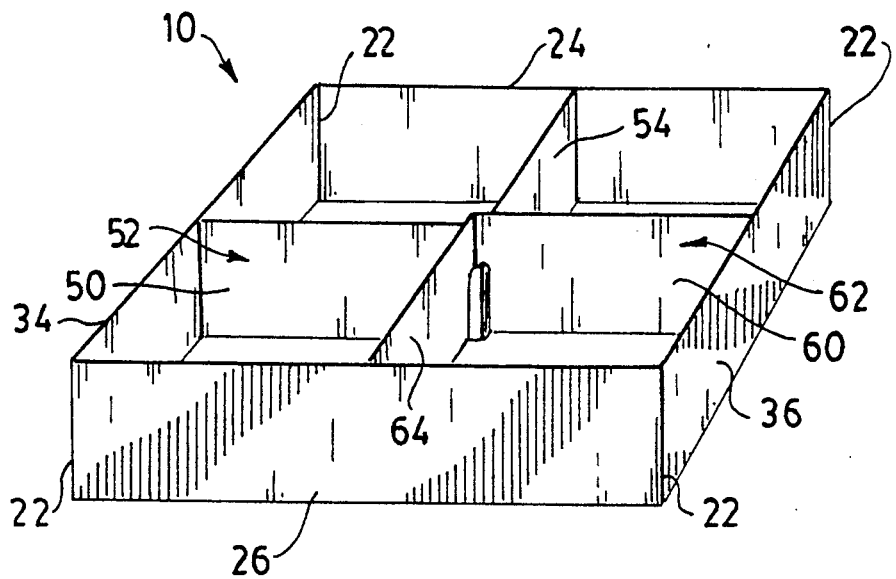
FIG. 13 is a perspective view showing an alternative interconnection of the interior walls in the first embodiment of the storage pen.

In the first embodiment, each connecting flap 50,60 includes a projecting section 52,62 which extends from the end wall 34,36 and a transverse section 54,56 which engages the sidewall 22,26. In the operative position, the projecting sections 52,62 extend perpendicular to the end walls and parallel to the sidewalls 24,26. The transverse sections 54,64 bend from the projecting sections 52,62 to form interior corners. As shown in FIGS. 1, 2 and 13 in the operative position of the first embodiment, the transverse sections 54,64 extend parallel to the end walls 34,36 to engage the sidewalls 24,26. In this embodiment, the transverse sections 54,64 may be releasably or fixedly attached to the sidewall 24,26. The interior corners of the connecting flaps 50,60 include means for releasably engaging the interior corners to retain the pen in the operative position.

Referring to FIG. 7, one interior corner includes a pair of apertures 55,56 at the junction of the projecting section 52 and the transverse section 54. Each aperture 55,56 has a generally inverted U configuration. The depending legs of the U define depending slots 57,58, such that the slots are parallel to each other and extend downward predetermined length.

The remaining interior corner includes a pair of arms 65,66 which connect the transverse section 64 to the projecting section 62 of the connecting flap 60. The length of the arms 65,66 is substantially equal to the distance between the slots 57,58. The bottom of the slots 57,58 and the bottom of the arms 65,66 are spaced the same distance from the supporting surface.

Figure 14:
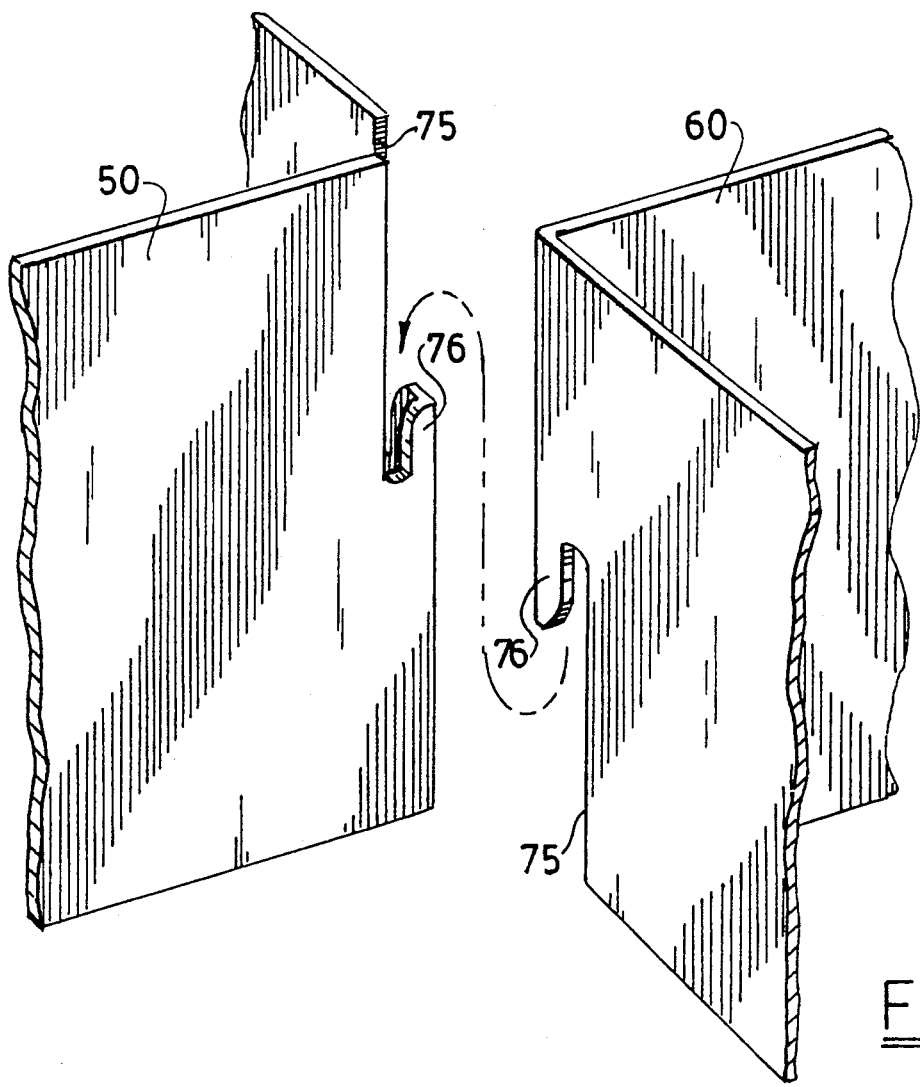
FIG. 14 is an enlarged perspective view showing the alternative interconnection of FIG. 13.

As shown in FIG. 13 and 14, in an alternative design of the first embodiment, each interior corner formed by connecting flaps 50,60 includes a transverse recess 75 at the junction of the projecting section and the transverse section. The transverse recess 75 of one connecting flap opens downwardly and the recess 75 of the remaining connecting flap open upwardly. The closed end of each recess 75 includes a projecting tab 76 spaced apart from the sides of the recess. As the recesses 75 are oppositely oriented, the tabs 76 project in opposite directions, and extend an equal distance from bottom of the recess 75.

Figure 9:
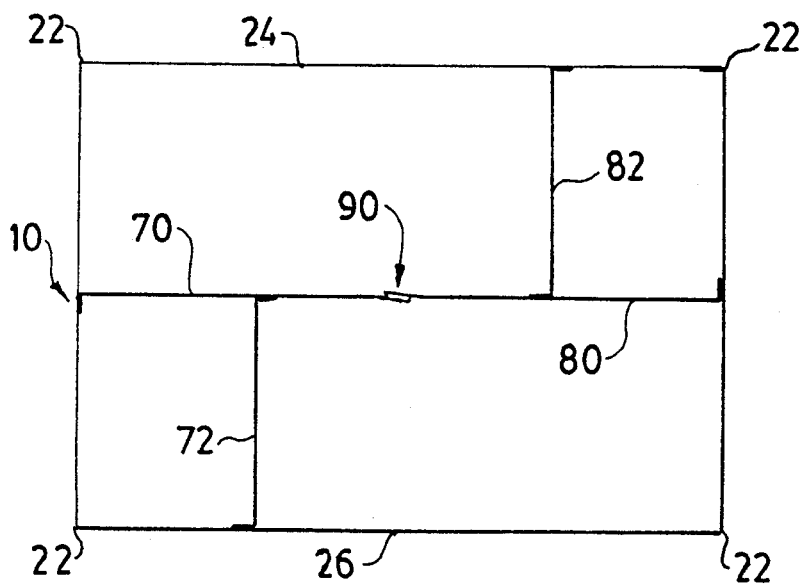
FIG. 9 is a top plan view of the second embodiment of the invention in the operative position.
Figure 10:
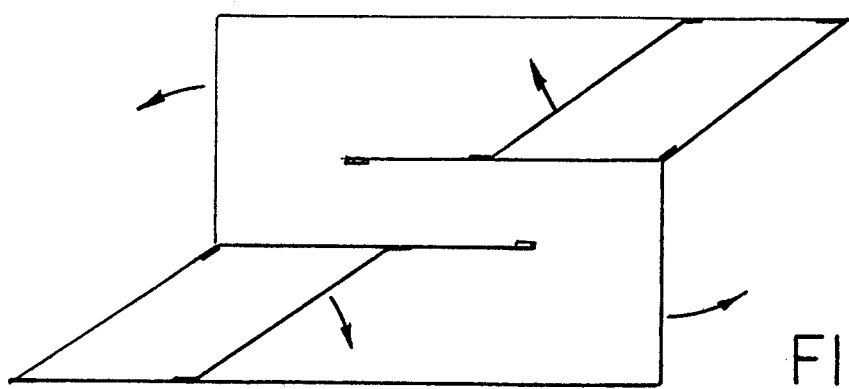
FIG. 10 is a top plan view of the second embodiment showing motion of the wall segments during transition from the operative to the collapsed positions.
Figure 11:
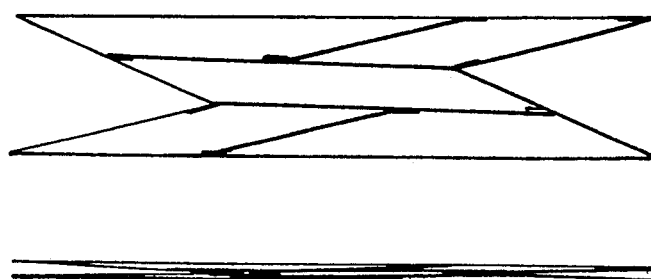
FIG. 11 is a top plan view further showing motion of the wall segments during transition.
Figure 12:
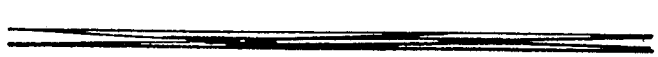
FIG. 12 is a top plan view showing the second embodiment in the collapsed position.

Referring to FIGS. 8 and 9, in the second embodiment, connecting flaps 70,80 extend from the end walls 34,36 to partially overlap and retain the pen 10 in the operative position. One or both of the connecting flaps 70,80 may include a transverse wall 72,82. The transverse walls 72,82 extend from the flap 70,80 to engage the sidewall 24,26 to further divide the interior of the pen 10. The transverse walls 72,82 have one end fixedly attached to either the connecting flap 70,80 or the sidewall 24,26, and the other end may be releasably or fixedly attached to the corresponding sidewall 24,26 or connecting flap 70,80.

As shown in FIGS. 8 and 9, in the operative position of the second embodiment, the connecting flaps 70,80 extend perpendicular from the opposing end walls 34,36 and parallel to the sidewalls 24,26 to partially overlap each other. The overlapping portions include means 90 for releasably engaging the connecting flaps to each other. Complimentary hook and loop fasteners or releasable adhesives may be used to engage the overlapping portions of connecting flaps 70,80.

OPERATION

Referring to FIGS. 1, 2, 6, 13 and 14 in the operative position of the first embodiment, the interior corners are interlocked to retain the pen 10 in the self-supporting operative position.

To collapse the first design of the first embodiment of the pen 10, the interior corner having the arms 65,66 is lifted relative to the remaining corner, such that the arms pass out of the slots 57,58. The arms 65,66 may then pass through the large portion of the U apertures 55,56, thereby separating the interior corners. In the second design of the first embodiment, the projecting tabs 76 overlap within the opposing recess 75, such that the interior corners interlock and retain the pen 10 in the open position. To separate the connecting flaps 50,60, the connecting flap having the downwardly Projecting tab 76 is lifted relative to the remaining connecting flap, and the interior corners may be separated. The bend lines 39 of the end walls 34,36 are then pushed towards each other and the interior corners pass each other.

The engagement of the transverse sections 54,64 to the sidewalls 24,26 either permits rotation relative to the sidewall, or the transverse section is disengaged from the sidewall. The movement of the end wall bend lines 39 towards each other continues as the transverse section 54,64 and projecting section 52,62 of each connecting flap 50,60 become parallel. The sidewalls 24,26 remain parallel and approach each other as the connecting flaps 50,60 and end walls 34,36 are sandwiched between the sidewalls. The pen 10 thereby collapses such that all the peripheral wall segments and interior connecting flaps 50,60 assume a parallel orientation having a length no longer than the length of the sidewalls 24,26.

Referring to FIGS. 8 and 9 in the operative position of the second embodiment, the pen 10 defines a plurality of storage areas. The overlapping portions of the connecting flaps 70,50 are engaged and the pen 10 is self-supporting.

To collapse the pen 10, the connecting flaps 70,80 are disengaged from each other. The bend lines 39 of the end walls 34,36 are then pushed towards each other causing the connecting flaps 70,80 to further overlap. As this occurs, the sidewalls 24,26 remain parallel, but move towards each other. The connecting flaps 70,80 further overlap. The motion of the bend lines 39 towards each other continues until the sections of each end wall 34,36 are substantially parallel to each other.

In each embodiment, the distance from the attachment point of the connecting flap and the end wall to the corner 22 of the sidewall 24,26 and end wall 34,36 defines a fixed distance. With respect to the first embodiment shown in FIGS. 1-5, the distance from the attachment point to the sidewall 24,26 and the length of the projecting section 52,62 of the connecting flap 50,60 is no longer than the sidewall, and preferably slightly less than the sidewall.

To permit the pen 10 to collapse to the length of the sidewall 24,26, in the second embodiment, the combined length of connecting flap 70,80 and the fixed distance is no longer than the length of the sidewall, and preferably slightly less than the sidewall.

An advantage of the present invention is that all the wall segments and flaps are fixedly attached to each other so that disassembly of multiple pieces is avoided. In addition, the permanently affixed wall segments permit the pen 10 to change from the operative position to the collapsed position without requiring insertion or removal of component pieces. While some sections may have a free, or releasably attached end, the remaining end is fixedly attached with respect to the peripheral wall. That is, all the wall segments and connecting flaps are fixedly attached to each other to form a one piece unitary articulated structure. The one piece construction includes a continuous, collapsible loop formed by the peripheral wall segments and the permanently hinged interior connecting flap.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A collapsible storage pen having an operative position for forming a storage area and a collapsed position, comprising:
   (a) a peripheral wall formed of articulated wall segments wherein the peripheral wall includes a pair sidewalls and a pair of interconnecting end walls, the end walls including a bend line intermediate of the sidewalls; and
   (b) an interior divider wall having one end hingedly attached to one end wall and the other end adapted to engage the peripheral wall int he operative position, the point of the attachment, length of the divider wall and the lengths of the articulated wall segments being selected so that the pen can be collapsed to a length no longer than the longest articulated wall segment.

2. A collapsible storage pen having an operative position for forming an interior storage area and a collapsed position, comprising:
   (a) a peripheral wall formed of articulated wall segments;
   (b) first and second interior divider walls, each divider wall permanently attached at one end to the peripheral wall and adapted to releasably engage the other divider wall in the operative position, the points of attachment, lengths of the divider walls and the lengths of the articulated wall segments being selected so that the pen can be collapsed to a length no longer than the longest articulated wall segment.

3. The collapsible storage pen of claim 2, wherein the articulated wall segments and the divider walls assume a parallel orientation in the collapsed position.

4. A collapsible bottomless storage pen movable between an operative position for forming a plurality of storage areas and a collapsed position, comprising:
   (a) a pair of sidewalls;
   (b) a pair of end walls interconnecting the sidewalls, each end wall hingedly attached to the sidewalls to form corners and each end wall including a bed line intermediate of the corners; and
   (c) an interior connecting flap hingedly attached to one end wall adjacent a bend line to define a fixed length from the hinged attachment to the corner, the interior connecting flap extending form the end wall intermediate of the corners;
   wherein the combined length of the connecting flap and the fixed length is less than the sidewall.

5. A collapsible bottomless pen having a collapsed position and an operative position, comprising:
   (a) a pair of sidewalls having substantially equal lengths;
   (b) a pair of end walls extending between the ends of the sidewalls, each end wall including a bend line defining a folding length extending from the sidewall to the bend line; and
   (c) a connecting flap hingedly attached to an end wall a fixed distance from one of the sidewalls, wherein the combined length of the connecting flap and the fixed distance is no longer than the sidewall.

6. The collapsible bottomless pen of claim 5, wherein the fixed distance is substantially equal to the folding length.

7. A collapsible bottomless storage pen having an operative position for delineating a plurality of package accommodating areas, and a collapsed position, comprising:
   (a) a peripheral wall including a pair of sidewalls and a pair of end walls hingedly connected to the sidewalls, each end wall including a bend line intermediate of the sidewalls;
   (b) a first interior connecting flap hingedly attached to one end wall at a first attachment point;
   (c) a second interior connecting flap hingedly attached to the other end wall at a second attachment point, the connective flaps having a sufficient distance such that the connecting flaps cooperatively engage each other in the operative position; and
   (d) engaging means for releasably engaging the connecting flaps in the operative position.

8. The collapsible bottomless storage pen of claim 7, wherein the connecting flaps have a sufficient length such that a portion of the connecting flaps overlap in the operative position.

9. The collapsible bottomless storage pen of claim 7, wherein the combined length of the first interior connecting flap and the distance along the end wall from the sidewall to the first attachment point is no longer than the length of the sidewall.

10. The collapsible bottomless storage pen of claim 7, wherein the combined length of the second interior connecting flap and the distance along the end wall from the sidewall to teh second attachment point is no longer than the length of the sidewall.

* * * * *